US006643313B2

(12) United States Patent
Hutchinson

(10) Patent No.: US 6,643,313 B2
(45) Date of Patent: Nov. 4, 2003

(54) MICROOPTOELECTROMECHANICAL SYSTEM (MOEMS) BASED LASER

(75) Inventor: Donald P. Hutchinson, Knoxville, TN (US)

(73) Assignee: UT Battelee, LLC, Oak Ridge, TN (US)

(*) Notice: Subject to any disclaimer, the term of this patent is extended or adjusted under 35 U.S.C. 154(b) by 62 days.

(21) Appl. No.: 09/849,922

(22) Filed: May 4, 2001

(65) Prior Publication Data

US 2002/0163951 A1 Nov. 7, 2002

(51) Int. Cl.[7] .............................................. H01S 3/03
(52) U.S. Cl. .......................... 372/64; 372/45; 372/93; 372/94
(58) Field of Search ........................ 372/64.75, 93, 372/102, 45, 94; 374/179

(56) References Cited

U.S. PATENT DOCUMENTS

| | | | | |
|---|---|---|---|---|
| 3,361,987 A | * | 1/1968 | De Maria | 372/94 |
| 4,815,094 A | * | 3/1989 | Cantoni | 372/93 |
| 4,870,654 A | * | 9/1989 | Cantoni et al. | 372/93 |
| 5,031,190 A | * | 7/1991 | Behfar-Rad | 372/94 |
| 5,097,479 A | * | 3/1992 | Opower | 372/64 |
| 5,132,983 A | * | 7/1992 | Behfar-Rad | 372/94 |
| 5,231,642 A | * | 7/1993 | Scifres et al. | 372/102 |
| 5,241,555 A | * | 8/1993 | Spitzer | 372/94 |
| 5,271,031 A | * | 12/1993 | Baer | 372/75 |
| 5,610,936 A | * | 3/1997 | Cantoni | 372/93 |
| 5,746,513 A | * | 5/1998 | Renken | 374/179 |
| 6,038,076 A | | 3/2000 | Bouzid et al. | |
| 6,155,490 A | | 12/2000 | Ackley | |

* cited by examiner

*Primary Examiner*—Paul Ip
*Assistant Examiner*—Tuan Nguyen
(74) *Attorney, Agent, or Firm*—Akerman Senterfitt

(57) ABSTRACT

A method for forming a folded laser and associated laser device includes providing a waveguide substrate, micromachining the waveguide substrate to form a folded waveguide structure including a plurality of intersecting folded waveguide paths, forming a single fold mirror having a plurality of facets which bound all ends of said waveguide paths except those reserved for resonator mirrors, and disposing a pair of resonator mirrors on opposite sides of the waveguide to form a lasing cavity. A lasing material is provided in the lasing cavity. The laser can be sealed by disposing a top on the waveguide substrate. The laser can include a re-entrant cavity, where the waveguide substrate is disposed therein, the re-entrant cavity including the single fold mirror.

25 Claims, 2 Drawing Sheets

MICROOPTOELECTROMECHANICAL SYSTEM (MOEMS) BASED LASER

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to laser devices, and more particularly to compact lasers suitable for portable applications.

BACKGROUND OF THE INVENTION

One area of science that offers significant size advantages, while overcoming the limitations of reducing the number and size of conventional parts is microelectromechanical systems (MEMS). MEMS, or the closely related field of microoptoelectromechanical systems (MOEMS), refers to systems that combine electrical and mechanical components, including optical components in the case of MOEMS, into a package that is physically very small. These systems are generally fabricated using integrated circuit fabrication techniques or similar techniques such as surface micromachining, bulk micromachining and reactive ion etching (RIE). For example, using MEMS/MOEMS, various transducers, resonators, and mirrors have been built that occupy sizes that are generally measured in terms of microns or millimeters. The degree of complexity of a given MEMS/MOEMS article depends on the number of movable levels or planes that the fabrication technique provides. MEMS/MOEMS techniques have not been applied to gas laser fabrication.

Conventional carbon dioxide lasers are large, cumbersome, and are difficult to package, particularly for portable applications. Even folded waveguide designs, such as the laser device disclosed in U.S. Pat. No. 5,610,936 to Cantoni, is too large to be useful for virtually all portable applications, being at least approximately 15–20 centimeters in length.

Accordingly, it would be desirable to provide a more compact laser device which can still deliver reasonably high output power. A MOEMS laser could allow construction of a laser device occupying a fraction of the size required for existing lasers. If a method could be devised for fabricating a MOEMS laser, such a laser would offer substantially reduced size and weight. Moreover, such a device would be more precise and cost effective due to advantageous manufacturing processes similar to those used for fabrication of microelectronics. Moreover, a MOEMS laser device could provide increased reliability and lower cost due to the ability to fabricate a highly compact waveguide substrate having a plurality of narrow folded waveguide paths, or preferably be used to fabricate a monolithic highly compact laser system on a single die of a bulk substrate material.

SUMMARY OF THE INVENTION

A laser device includes a waveguide substrate having a plurality of intersecting folded waveguide paths, the plurality of folded waveguide paths having widths of no more than approximately 1 mm, the folded waveguide paths having a surface area to volume ratio of at least 4 $mm^{-1}$. The folded waveguide paths can have widths of no more than approximately 0.5 mm, or from approximately $10\mu$ to 0.5 mm.

The laser device can further include a re-entrant cavity adapted for substantially surrounding and sealing the sides and bottom of the waveguide substrate, and at least one plate layer disposed on the waveguide substrate. The laser can further include an electrode array disposed on the at least one plate layer, the electrode array including a plurality of conductive traces adapted for alignment with the plurality of folded waveguide paths. At least one plate layer can be formed from a material selected from the group consisting of $Al_2O_3$ and BeO.

The laser device can further include a bulk substrate material having a plurality of die, the waveguide structures are formed on the bulk substrate material. The bulk substrate material can be used to form the waveguide substrate. The laser can further include a RF oscillator, wherein the RF oscillator is formed on the die, the RF oscillator adapted for electrically pumping the laser. The laser can further include at least one lasing material selected from the group of gases consisting of $CO_2$, CO and $N_2O$. Preferably, the lasing material is $CO_2$.

The bulk substrate material can be selected from the group consisting of $Al_2O_3$, BeO and Si. The laser can further include a pair of mirrors attached to substantially opposing ends of the waveguide substrate.

A method for forming a laser device includes the steps of providing a waveguide substrate, forming a folded waveguide structure from a plurality of intersecting folded waveguide paths formed in the waveguide substrate, the folded waveguide paths having widths of no more than approximately 1 mm, the folded waveguide paths having a surface area to volume ratio of at least 4 $mm^{-1}$. The folded waveguide paths can have widths of no more than approximately 0.5 mm, or from approximately $10\mu$ to 0.5 mm.

The method for forming a laser device can further include the steps of providing a re-entrant cavity, placing the waveguide substrate into the re-entrant cavity, providing at least one plate layer, and sealing at least one plate layer on top of the plurality of folded waveguide paths. At least one plate layer can include an electrode array thereon, the electrode array having conductive traces aligned to substantially match the plurality of folded waveguide paths. The method can further include the step of providing a bulk substrate material having a plurality of die, wherein a plurality of the folded waveguide structures are formed on the bulk substrate material. The bulk substrate material can be used as the waveguide substrate. The bulk substrate material can be selected from the group consisting of $Al_2O_3$, BeO and Si.

The method can be made monolithic by including the steps of coating the plurality of die with at least one coating layer onto the walls of the folded waveguide paths to reduce intracavity waveguide path losses, forming at least one plate layer on the plurality of die, the at least one plate layer positioned on top of the plurality of folded waveguide paths, and forming mirrors on the plurality of die, the mirrors positioned on substantially opposite ends of the laser. The method can further include the step of forming a conductive electrode array having a plurality of conductive traces on the plurality of die, the electrode array positioned on at least one of the plate layers, the plurality of conductive traces substantially aligned with the folded waveguide paths. The method can further include the step of forming an RF power supply on the plurality of die.

The laser can be used for many applications, but is particularly useful for portable applications due to its small size. For example, the laser can processing electromagnetic signals including, but not limited to, LIDAR, communication systems, chemical detection and military target designators.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 1:
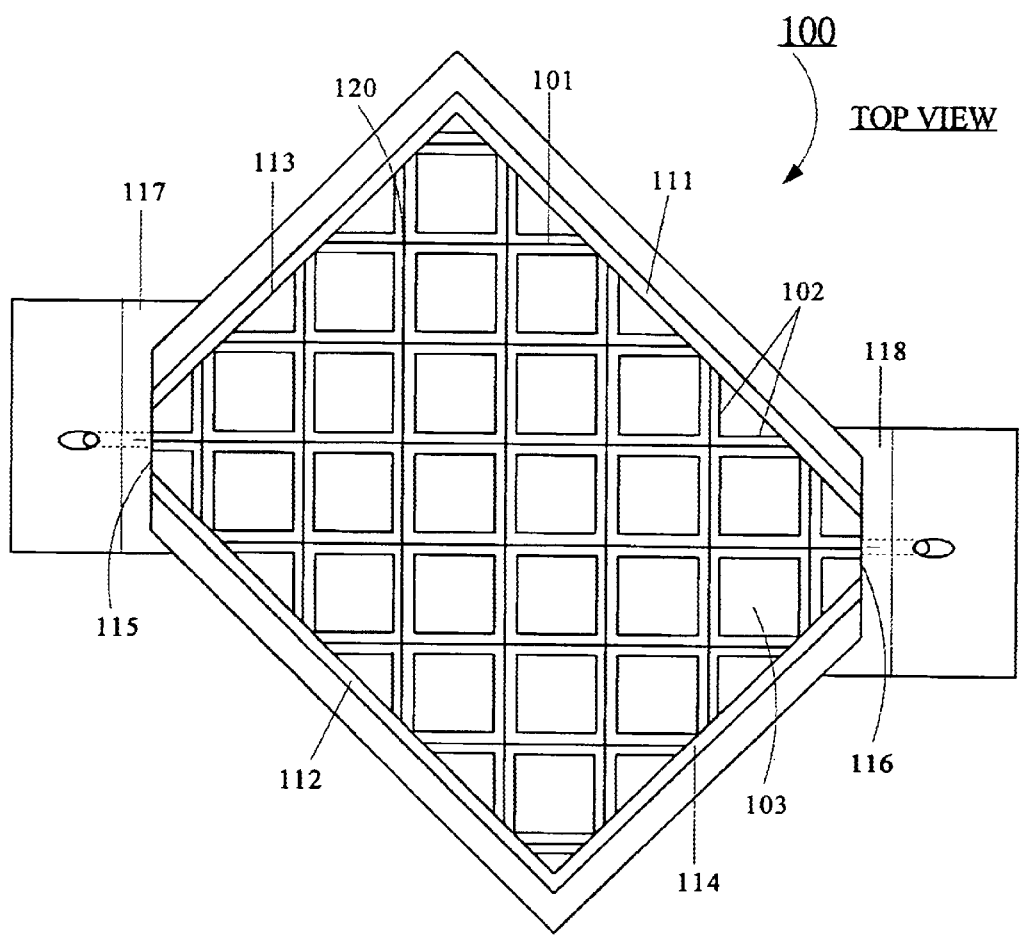
FIG. 1 illustrates a top view of a laser, according to an embodiment of the invention.

Referring to FIG. 1, atop view of a laser device 100 according to an embodiment of the invention is shown. For simplicity, the top sealing layer is not shown in FIG. 1, but is rather shown in FIG. 2. The active resonator formed can he used as either a laser oscillator or a power amplifier, or as a combined oscillator and amplifier. Laser 100 can be operated in either continuous wave or pulsed mode.

In one embodiment of the invention, a master oscillator power amplifier (MOPA) is formed. MOPA lasers can be used to increase the output power of single-mode lasers while maintaining a narrow linewidth. MOPAs use a structure having an oscillator section which produces a very narrow spectral output, and an integrated power amplifier section that increases the output power of the overall device without significantly affecting the spectral width.

Waveguide paths 102 are preferably formed by machining a waveguide 103 by using standard lithographic and etching techniques which are commonly used in electronic circuit fabrication. Lines 101 shown in FIG. 1 correspond to the central axes of waveguide paths 102. In the preferred embodiment, a plurality of folded waveguide structures each comprising a plurality of waveguide paths 102 are fabricated simultaneously, each folded waveguide structure occupying an area of a die on a bulk substrate material (not shown). Bulk substrate materials can generally be selected from a wide variety of materials. However, selecting the bulk substrate material from dielectric materials such $Al_2O_3$, BeO or $SiO_2$ preferably allows the bulk substrate material to also be used as the waveguide material. This can significantly simplify processing, improve reliability and reduce fabrication costs.

Preferably, etching of waveguide paths 102 is performed using reactive ion etching (RIE). Using techniques such as RIE, waveguide path widths and thicknesses as small as a fraction of a micron can be formed. In one embodiment of the invention, waveguide paths 102 have widths of approximately 1 mm. In another embodiment of the invention, folded waveguide paths 102 may have widths of no more than approximately 0.5 mm. Without special waveguide path processing, intracavity waveguide losses which result in less power then would otherwise be predicted from a given cavity gain length, generally become too large to derive benefit from reducing waveguide path widths to less than approximately 0.5 mm. This same limiting effect also generally sets a corresponding minimum useful waveguide path thickness.

However, it may be possible to utilize waveguide path widths and thicknesses significantly below 0.5 mm, if appropriate waveguide coating layers are used, such as those used to construct vertical cavity surface emitting lasers (VCSELs). Coating layers, such as thorium hexafluoride or thorium oxide and/or the use of one or more layers of index matching materials, can permit substantially reduced intracavity waveguide path 102 losses which can allow practical laser waveguide channel widths and thicknesses as small as approximately $10\mu$.

Narrow and shallow waveguide paths 102 on the order of several mms or less permits laser 100 to have folded waveguide paths advantageously having high surface area to volume ratios. For example, for a square waveguide path configuration, waveguide paths having 1 mm sides results in a surface area to volume ratio of at approximately 4 $mm^{-1}$. Similarly, for a 0.5 mm square configuration a surface area to volume ratio of at approximately 8 $mm^{-1}$, while waveguide paths having 0.01 mm ($10\mu$) sides result in a surface area to volume ratio of approximately 400 $mm^{-1}$.

High surface area to volume ratios provided by the invention permits the preferred gas laser embodiment of the invention to be cooled exclusively by gas particle collisions with the waveguide walls. Thus, gas laser 100 removes the need for an added structure for cooling. This can reduce cost, reduce size and improve reliability of a laser device. Improved cavity cooling provided by gas laser 100 can also permit higher pressure laser operation which generally results in higher power output per unit active laser area. Moreover, if laser 100 is electrically pumped, shallow waveguide thicknesses permit the use of correspondingly lower excitation voltages to attain a desired level of pumping, whether the amplifying medium is solid, liquid or gas.

Unlike conventional RF driven $CO_2$ lasers which are generally 20 to 30 cm in length, $CO_2$ laser 100 using 1 mm waveguide path widths for example, can produce a nominal 1 Watt laser output in an area of approximately 2.5 cm×2.5 cm, having a thickness of approximately 3 mm. However, as noted earlier, if waveguide path boundaries are appropriately coated to minimize intracavity optical losses, the area of laser 100 can be reduced by up to two orders of magnitude, while still maintaining a useful output power level.

In the preferred embodiment, a RF power supply (not shown) is used to pump laser 100. Preferably, the RF power supply can be formed on the same die as laser 100. In another embodiment, the RF power supply is built separately but is included in a package housing both laser 100 and the RF power supply. In this hybrid embodiment which stacks laser 100 and the RF power supply, laser 100 having 1 mm waveguide path widths can be housed in a package having a volume of approximately 3 cm×3 cm×3 cm.

In one embodiment of the invention, analogous to the assembly of integrated circuits, fabricated waveguide structures having a plurality of waveguide paths 102 on a bulk substrate material can be separated into individual die. As noted earlier, the bulk substrate material used is preferably, but not necessarily, also used as the waveguide material. Individual die each having a waveguide substrate including a plurality of narrow folded waveguide paths can then each be positioned inside a re-entrant cavity. A preferred re-entrant cavity is formed from a reflective bottom (not shown) and four reflective sidewalls 111–114 arranged as shown in FIG. 1. The re-entrant cavity functions to form the folding mirrors and bottom for the laser 100. The waveguide structure and re-entrant cavity are preferably permanently attached to the using bonding methods well known in the art to form gas seals along areas of contact.

The re-entrant cavity can be formed from any material or combination of materials having the desired level of reflectivity in the wavelength range of interest. For example, materials such as silicon, ceramics or metals (with reflecting coatings such as Al or Au) may be appropriate for use in forming re-entrant cavities for laser applications near $10\mu$, such as for a $CO_2$ laser. The use of appropriate coatings may enable the use of a broader range of re-entrant cavity materials.

If laser 100 is electrically pumped, the re-entrant cavity bottom preferably comprises an electrically conductive ground plane electrode positioned for use as a lower electrode for laser 100. Re-entrant cavity preferably has gaps on two (2) ends 115 and 116 which permits mounting of mirrors 117 and 118 to form a sealed resonator. In the preferred embodiment of a $CO_2$ laser, at a wavelength of approximately $10\mu$, one mirror is preferably a near total reflector and one mirror is preferably a substantially transmissive output coupler. The near total reflector can be made from silicon with a dielectrically enhanced highly reflective coating. The output coupler is preferably made of zinc selenide, with an anti-reflection coating on the surface facing away from the laser cavity, and a reflective coating on the surface facing toward the laser cavity, the reflectivity depending upon the physical length of the laser resonator. The total reflector and output coupler location can be interchanged depending on which output configuration is desired for a given application.

For operation of laser 100 as an amplifier, the total reflector and output coupler can be replaced by transparent windows in the same location, to allow input of optical radiation into the amplifier from a separate oscillator on one end, and power extraction from the amplifier at the other end. In one embodiment, these windows are made from zinc selenide, with anti-reflection coatings on all optically exposed window surfaces.

Figure 2:
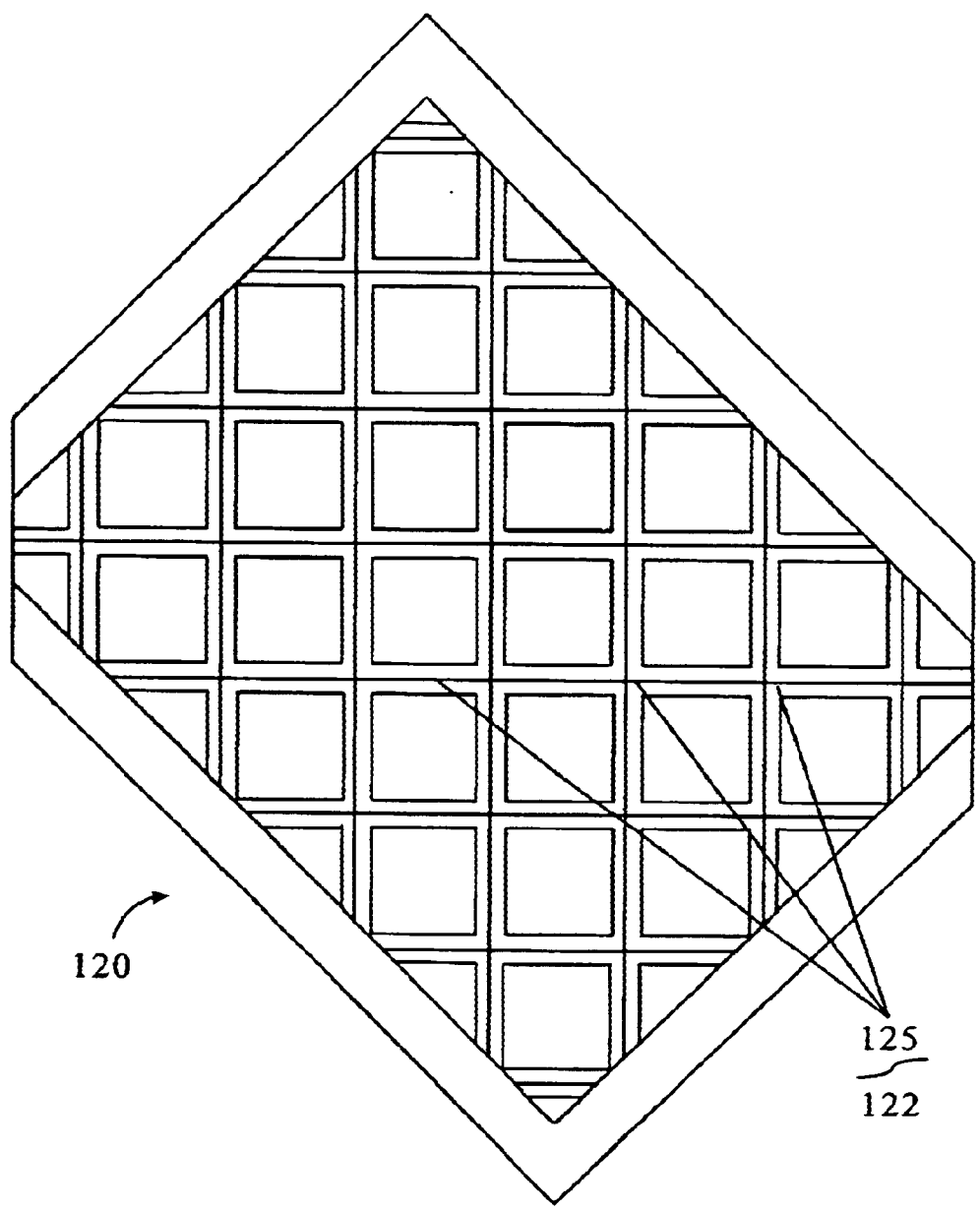
FIG. 2 illustrates a plate layer having a plurality of conductive traces, according to an embodiment of the invention.

Plate layer 120, is shown in FIG. 2 and can be mechanically positioned and secured on top of folded waveguide laser 100 to form a substantially gas tight top seal for laser 100. Preferable plate 120 materials for this purpose include $Al_2O_3$ (alumina) and BeO (beryllia). Improved mode characteristics for laser 100 can result if the plate material is chosen to coincide with the waveguide material.

For applications where laser 100 is electrically pumped, an electrode array 122 comprising a plurality of conductive traces 125 is positioned on plate layer 120 as shown in FIG. 2. Alignment of plate layer 120 permits the conductive traces 125 to substantially overlap waveguide paths 102. The conductive array 122 can be formed using the process of electroplating or other methods known in the art. Conductors, such as Cu or Al, may be used for this purpose. Preferably, conductive traces 125 are sized such that little or no overlap over waveguide regions not having waveguide paths 102 results, since overlap into these regions results in wasting electric field lines which could otherwise be used to pump amplifying material. In the preferred embodiment, conductive traces 125 each cover approximately 80% of waveguide path width.

Mirrors 117 and 118 can be bonded to the re-entrant cavity gaps 115 and 116 on each end of the folded waveguide laser cavity to form a sealed resonant cavity. The choice of mirror materials and associated characteristics depending on factors including the gain of the lasing material used, the desired output power and the geometry of laser 100. High gain lasing materials such as $CO_2$, will generally be optimized with relatively lossier mirrors.

If laser 100 is electrically pumped, a wire-bonded lead can be attached to plate layer 120 having the conductive traces 125 and another wire bonded lead (not shown) attached to the ground plane connected to the bottom of the re-entrant cavity (not shown). These bond wires can be used for connection of conductive traces 125 of plate layer 120 and the ground plane to a RF power supply (not shown), which is preferably formed on the same die as laser 100.

The small size of laser 100 permits higher output power per unit volume compared to available lasers, including folded laser cavities disclosed in available art. Particularly, in gas laser applications, the small size of waveguide paths 102 permits use of higher gas pressures which results in higher laser output powers due to enhanced conductive gas cooling effects from wall collisions. However, at some point, increasing pressure will begin reducing laser power because of gas mobility degradation, placing a limit on the maximum operating pressure for gas laser 100. Thinner laser 100 dimensions also permits the use of lower pumping voltages, assuming electrical pumping is used, whether the amplifying material is a solid, liquid (assuming the liquid may be electrically pumped) or a gas.

Laser 100 may use solid, liquid or gaseous amplifying mediums to fill waveguide paths 102. In the case of liquid amplifying mediums, layers positioned above the medium such as plate layer 120 should be substantially optically transmissive to permit conventional optical pumping. In this case, conductive traces 125 and a RF power supply are not required.

In the preferred embodiment, laser 100 is a gas laser filled with a gaseous amplifying medium. For example, for approximately $11\mu$ operation $N_2O$ may be used, for approximately $10\mu$ operation $CO_2$ (main line at $10.6\mu$) may be used and for approximately $5.5\mu$ operation, CO may be used. In the most preferred embodiment of the invention, $CO_2$ is used as the amplifying medium (along with He and $N_2$ as it is normally used). Using the invention, a $CO_2$ gas laser can be constructed being no larger than a wrist watch. This can be compared to conventional $CO_2$ gas lasers which are an order of magnitude larger in area, and as a result, are cumbersome and difficult (if not impossible) to package for portable applications.

In the most preferred embodiment of the invention using $CO_2$ as the amplifying medium, the $CO_2$ mixture is sealed in laser 100 having a pressure of approximately 100 to 300 torr. However, $CO_2$ laser 100 may operate properly at pressures up to 760 torr (1 atmosphere). A RF power supply preferably provides approximately 10 to 30 watts of power to pump laser 100 for the embodiment having approximately 0.5 mm waveguide path 102 widths and correspondingly similar waveguide thicknesses. In this most preferred embodiment of the invention, the typical starting voltage is 100 to 200V, while typical operating voltages are from 20 to 30V. Typical RF frequencies are from 50 MHz to 90 MHz. RF pumping allows a pulsed laser output and may also provide a continuous output. Output power produced by this embodiment of laser 100 is approximately 1 to 2 watts, producing an efficiency for converting RF input energy to light output of approximately 10%. As used herein, "light" means not only signals in the spectrum of visible light, but also signals in the full spectrum of frequencies typically handled by optical transmission systems.

Using $CO_2$ as an amplifying medium, laser 100 can operate at approximately $10\mu$. At $10\mu$, laser is inherently eye-safe. Current laser radar systems, laser based communication systems and military target designators use short wavelength lasers operating in the visible to near infrared (approximately $0.5\mu$ to approximately $2\mu$) wavelength region of the spectrum. Lasers operating at approximately $0.5\mu$ to approximately $2\mu$ have been known to cause damage to the eyes of humans.

Moreover, short wavelength lasers (operating at approximately $0.5\mu$ to approximately $2\mu$) also have poor penetration through transmission barriers such as fog and battle field smoke. Carbon dioxide lasers, operating at approximately $10\mu$, have been considered for these applications but have been rejected because they have been too large and bulky for use in these and other related applications. Accordingly, a miniature $CO_2$ laser producible by using the invention should find broad application in a variety of applications due to better atmospheric transmission characteristics and improved eye safety, compared to shorter wavelength lasers.

Atmospheric transport of output beams from laser 100 can be improved through selection of less naturally abundant isotopes. For example, various naturally occurring isotopes exist in reasonable quantities for both carbon and oxygen. For example, $C_{13}$ accounts for approximately 7% of all carbon atoms. By using $CO_2$ gas having enhanced levels of $C_{13}$, transmission characteristics through the atmosphere can be improved due to reduced interaction of the laser beam with the atmosphere, compared to $CO_2$ having a naturally occurring percentage of carbon isotopes. Similarly, enhanced levels of $O_{16}$ and/or $O_{18}$ can be used either alone or in combination with enhance levels of $C_{13}$ to further improve atmospheric transport of light output by laser 100.

An entirely monolithic fabrication method can preferably be used to form a monolithic highly compact laser system on a single die of a bulk substrate material. Using this method, a highly compact waveguide substrate having a plurality of narrow folded waveguide paths is formed as disclosed earlier on a single die of a bulk substrate material. Preferably, a RF power supply is also formed on the same die simultaneously with laser 100, if electrical pumping is to be used. Waveguide path widths and thicknesses can be formed on the order of several microns, or even fractions of a micron, using available lithography and etching techniques.

If electrical pumping is used, an electrically conductive and optically reflective layer is formed on the bottom of the folded waveguide paths. One or more openings may be formed through the bottom of selected waveguide paths through the bulk substrate material to provide later access to the laser cavity to enable filling the laser cavity with gaseous or liquid lasing materials. Waveguide coating layers are used to coat the walls of waveguide paths, such as those used to construct vertical cavity surface emitting lasers (VCSELs), can be used to reduce intracavity waveguide path losses.

A plate layer is then deposited to seal the top of laser 100. If laser 100 is to be a gas or liquid laser, a sacrificial layer may be placed in the waveguide channels formed by folded waveguide paths to permit formation of a plating layer thereon. If laser 100 uses a solid amplifying medium, the amplifying medium is formed in the folded waveguide paths prior to plate layer formation. Plate layer can then be formed. If a sacrificial layer is used, the sacrificial layer can then be removed using techniques such as the "ashing" of hydrocarbons materials such as photoresists if a photoresist sacrificial layer is used or other appropriate techniques of volatilization for other sacrificial materials.

If desired, a conductive electrode array having a plurality of conductive traces is positioned substantially on the plate layer being substantially aligned with the waveguide paths.

Trenches may then be created to permit formation of appropriate mirrors, preferably having dielectric coatings or being formed from dielectric materials, on both ends of the laser to complete formation of laser 100.

During assembly, assuming gas or liquid laser operation, the one or more openings formed through the bottom of selected waveguide paths through to the bulk substrate material are reopened if necessary to provide later access to the cavity to enable filling the laser cavity with gaseous or liquid lasing materials. A suitable sealant layer is applied to seal these openings during assembly.

I claim:

1. A laser device, comprising:
    a waveguide substrate, said waveguide having a plurality of micromachined intersecting folded waveguide paths,
    a single fold mirror means having a plurality of facets bounding all ends of said waveguide paths except those reserved for resonator mirrors;
    a pair of resonator minors attached to opposite sides of said waveguide to form a lasing cavity;
    a lasing material in said lasing cavity, and
    structure for sealing a top of said waveguide substrate.

2. The laser device of claim 1, wherein said single fold mirror comprises a re-entrant cavity, wherein said waveguide substrate is disposed in said re-entrant cavity.

3. The laser device of claim 1, wherein said plurality of folded waveguide paths have widths from approximately 10 $\mu$m to 0.5 mm.

4. The laser device of claim 1, wherein said structure for sealing comprises
    at least one plate layer disposed on said waveguide substrate.

5. The laser device of claim 4, further comprising an electrode array disposed on said at least one plate layer, said electrode array including a plurality of conductive traces which align with said plurality of folded waveguide paths.

6. The laser device of claim 5, wherein said at least one plate layer is formed from a material selected from the group consisting of $Al_2O_3$ and BeO.

7. The laser device of claim 1, further comprising a bulk substrate material having a plurality of die, wherein said waveguide structure is formed on said bulk substrate material.

8. The laser device of claim 7, wherein said bulk substrate material is used to form said waveguide substrate.

9. The laser device of claim 1, further comprising a RE oscillator, wherein said RE oscillator is formed on said die and provides electrical pumping for said laser.

10. The laser device of claim 1, wherein said lasing material is selected from the group of gases consisting of $CO_2$, CO and $N_2O$.

11. The laser device of claim 10, wherein said lasing material is $CO_2$.

12. The laser device of claim 7, where said bulk substrate material is selected from the group consisting of $Al_2O_3$, BeO and Si.

13. A method for forming a folded laser device, comprising the steps of:
    providing a waveguide substrate;
    etching said waveguide substrate to form a folded wave guide structure including a plurality of intersecting folded wave guide paths in said waveguide substrate;
    forming a single fold mirror means having a plurality of facets which bound all ends of said waveguide paths except those reserved for resonator mirrors;

disposing a pair of resonator mirrors on opposite sides of said waveguide to form a lasing cavity;

providing a lasing material in said lasing cavity, and sealing a to of said wave aide substrate.

14. The method for forming a laser device of claim 13, wherein said micromachining comprises reactive ion etching (RIE).

15. The method for forming a laser device of claim 13, wherein said folded waveguide paths have widths of from approximately 10 µm to 0.5 mm.

16. The method for forming a laser device of claim 13, further comprising the steps of:

forming a re-entrant cavity, said re-entrant cavity including said single fold mirror;

placing said waveguide substrate into said re-entrant cavity;

providing at least one plate layer, and sealing said at least one plate layer on top of said plurality of folded waveguide paths.

17. The method for forming a laser device of claim 16, wherein said at least one plate layer includes an electrode array thereon, said electrode array having conductive traces aligned to match said plurality of folded waveguide paths.

18. The method for forming a laser device of claim 13, further comprising the step of providing a bulk substrate material having a plurality of die, wherein a plurality of said folded waveguide structures is formed on said bulk substrate material.

19. The method for forming a laser device of claim 18, wherein said bulk substrate material is used as said waveguide substrate.

20. The method for forming a laser device of claim 18, wherein said bulk substrate material is selected from the group consisting of $Al_2O_3$, BeO and Si.

21. The method for forming a laser device of claim 18, further comprising the step of forming a RF power supply on said plurality of die.

22. The method for forming a laser device of claim 18, further comprising the steps of:

coating said plurality of die with at least one coating layer onto walls of said folded waveguide paths to reduce intracavity waveguide path losses;

forming at least one plate layer on said plurality of die, said at least one plate layer positioned on top of said plurality of folded waveguide paths, and forming mirrors on said plurality of die, said mirrors positioned on substantially opposite ends of said laser, whereby said laser formed is a monolithic device.

23. The method for forming a laser device of claim 22, further comprising the step of forming a conductive electrode array having a plurality of conductive traces on said plurality of die, said electrode array positioned on at least one of said plate layers, said plurality of conductive traces aligned with said folded waveguide paths.

24. The method for forming a laser device of claim 23, further comprising the step of forming an RF power supply on said plurality of die.

25. A meted for processing an electromagnetic signal which comprises utilizing:

a folded laser device, said folded laser device including a waveguide substrate, said waveguide having a plurality of micromachined intersecting folded waveguide paths;

a single fold mirror means having a plurality of facets bounding all ends of said waveguide paths except those reserved for resonator mirrors;

a pair of resonator mirrors attached to opposite sides of said waveguide to form a lasing cavity, a lasing material in said lasing cavity, and structure for sealing the top of said waveguide substrate, wherein said utilizing is at least one selected from the group consisting of LIDAR, communication systems, chemical detection and military target designators.

* * * * *